UNITED STATES PATENT OFFICE.

MILTON H. CAMPBELL, OF NEW YORK, N. Y., ASSIGNOR OF ONE-HALF TO NORVIN GREEN, OF SAME PLACE.

FLUX FOR ALLOYING PLATINUM.

SPECIFICATION forming part of Letters Patent No. 253,158, dated January 31, 1882.

Application filed October 20, 1881. (Specimens.)

*To all whom it may concern:*

Be it known that I, MILTON H. CAMPBELL, of the city, county, and State of New York, have invented a new and useful Flux, particularly adapted to the alloying of silver, copper, or gold with platinum, as well as for other metallurgic purposes, of which the following is a specification.

In alloying platinum with other metals I find it essential to the production of a perfectly homogeneous alloy to employ a flux within whose mass, when subjected to heat, such chemical reactions shall occur as will develop an intense degree of heat, and wherein at the same time, from the agency of the flux, there shall be produced a violent condition of ebullition; also, that the flux shall afford a slag covering for the fused metals, which shall not only perfectly protect them from the oxygen of the air, but as well serve the purpose of preventing an escape of heat generated within the molten mass. Sodic hyposulphite, potassium nitrate, and sodic biborate afford a flux fulfilling all these requirements, and is also of such a character as not to destroy or injure the metals, as by its giving off such chemical agents as have a strong affinity for them. The proportions of these ingredients which I prefer are sodic hyposulphite, twenty parts; potassium nitrate, thirty parts; sodic biborate, fifty parts.

In the fusion of the flux the principal purpose of the sodic hyposulphite is to create a violent condition of ebullition throughout the molten mass within the crucible, thereby causing the platinum fragments to be rapidly moved from one position to another therein, and materially accelerating the process of their fusion. The oxygen set free from the potassium nitrate rapidly combines with the agents liberated from the sodic hyposulphite and borax, and this reaction between the oxygen and other agents is attended with the development of a degree of heat many fold that externally applied to the crucible. Sodic biborate not only affords an agent for combination with the oxygen from the potassium nitrate, but is the principal element of the flux which renders the slag vitreous in character, and therefore impervious to air and a non-conductor of heat.

In the fusion of those metals which are less refractory to the action of heat than platinum, sodic hyposulphite may be omitted from the flux, as the other elements will produce and retain enough heat to fuse the platinum and produce a homogeneous alloy. However, ebullition effected by the employment of sodic hyposulphite within the slag will greatly accelerate a fusion and union of the metals, though for effecting ebullition for this purpose I do not desire to limit myself solely to the use of sodic hyposulphite.

It is obvious that instead of potassium nitrate I may employ an equivalent oxygen-bearing agent, as nitrate of soda. If the degree of heat required for fusion be not too great, potassium nitrate might be altogether omitted, as ebullition within the flux due to the sodic hyposulphite would enable fusion at a comparatively low temperature.

In changing the parts or varying the proportions of the ingredients of the flux, if copper is one of the metals to be alloyed, enough borax or borax and sodic hyposulphite must be employed to afford a sufficient amount of alkali to neutralize the free nitric or other acid; otherwise the copper would be attacked and destroyed, though silver in the place of copper would not be injured. Again, if silver is to be fused, the amount of sodic hyposulphite must not be excessive, as such use would be attended with a liberation of sulphurous vapor, which would be detrimental to the silver, though not to copper if substituted in its place.

It should be recollected, in the substitution of such substances as lime, &c., containing alkalies in place of borax, that some of them otherwise suitable cannot be advantageously employed, as their use would result injuriously to the crucible.

While the ingredients of the flux and their proportions may be considerably changed, I find those elements and relative amounts before mentioned preferable.

The ingredients of the flux may be separately or altogether ground into a coarse powder. When thus prepared they should be sealed in a closed vessel from the air to avoid deliquescence.

I am aware that it is not new with me to employ a flux consisting of borax and saltpeter, nor of borax and saltpeter when united with substances containing either chlorine or arsenic. Such matter, therefore, I do not wish to be understood as claiming in this case.

In this application for a patent I do not desire to claim a homogeneous alloy of either silver, copper, or gold with platinum; nor do I desire to herein claim the method of alloying silver, copper, or gold with platinum by means of my flux; but I desire to reserve the right of claiming these inventions in other applications to be hereafter filed.

What I claim, and desire to secure by Letters Patent, is—

1. A flux for metallurgic purposes, consisting of sodic hyposulphite for effecting ebullition, an oxygen-yielding substance for generating intense heat, and a slag-producing substance for affording a covering which shall be impervious to air and a non-conductor of heat, substantially as specified.

2. A flux consisting of sodic hyposulphite, potassium nitrate, and sodic biborate, or their equivalents.

3. A flux consisting of twenty parts sodic hyposulphite, thirty parts potassium nitrate, and fifty parts sodic biborate, substantially as specified.

Signed by me this 14th day of October, 1881.

MILTON H. CAMPBELL.

Witnesses:
W. B. VANSIZE,
WM. ARNOUX.